United States Patent
Sprague et al.

(10) Patent No.: US 8,797,633 B1
(45) Date of Patent: Aug. 5, 2014

(54) DISPLAY DEVICE ASSEMBLY AND MANUFACTURE THEREOF

(75) Inventors: Robert A. Sprague, Saratoga, CA (US); Bryan Hans Chan, San Francisco, CA (US); Craig Lin, San Jose, CA (US)

(73) Assignee: SiPix Imaging, Inc., Fremont, CA (US)

(*) Notice: Subject to any disclaimer, the term of this patent is extended or adjusted under 35 U.S.C. 154(b) by 971 days.

(21) Appl. No.: 12/837,350

(22) Filed: Jul. 15, 2010

Related U.S. Application Data

(60) Provisional application No. 61/228,074, filed on Jul. 23, 2009.

(51) Int. Cl.
*G02B 26/00* (2006.01)

(52) U.S. Cl.
USPC .... 359/296; 359/316; 257/257; 257/E33.074; 257/E33.071; 345/41; 345/60; 345/107

(58) Field of Classification Search
USPC ............. 257/E33.074, E33.071, 258; 438/30; 359/296, 316; 349/58, 73, 74; 345/690, 345/55, 60, 107
See application file for complete search history.

(56) References Cited

U.S. PATENT DOCUMENTS

| | | |
|---|---|---|
| 1,484,287 A | 2/1924 | Bailey |
| 4,083,626 A | 4/1978 | Miyahara et al. |
| 5,151,801 A | 9/1992 | Hiroshima |
| 5,737,042 A | 4/1998 | Shinohara et al. |
| 5,844,720 A | 12/1998 | Ohara et al. |
| 5,917,664 A | 6/1999 | O'Neill et al. |
| 5,919,551 A | 7/1999 | Cobb et al. |
| 6,144,430 A | 11/2000 | Kuo |
| 6,166,787 A | 12/2000 | Akins et al. |
| 6,277,263 B1 | 8/2001 | Chen |
| 6,304,365 B1* | 10/2001 | Whitehead .................. 359/296 |
| 6,327,013 B1 | 12/2001 | Tombling et al. |
| 6,422,715 B2 | 7/2002 | Naghi et al. |
| 6,474,826 B1 | 11/2002 | Tanaka et al. |
| 6,527,410 B2 | 3/2003 | Yamaguchi |
| 6,556,261 B1 | 4/2003 | Krusius et al. |
| 6,565,729 B2 | 5/2003 | Chen et al. |
| 6,753,064 B1 | 6/2004 | Kim |
| 6,784,962 B2 | 8/2004 | Sumida et al. |
| 6,930,818 B1 | 8/2005 | Liang et al. |
| 6,940,569 B2 | 9/2005 | Tanaka et al. |
| 6,997,595 B2 | 2/2006 | Mi et al. |

(Continued)

FOREIGN PATENT DOCUMENTS

| | | |
|---|---|---|
| JP | 2001-134204 | 5/2001 |
| TW | 200742672 | 11/2007 |

(Continued)

OTHER PUBLICATIONS

U.S. Appl. No. 12/843,396, filed Jul. 26, 2010, Sprague et al.

(Continued)

*Primary Examiner* — Kimberly Rizkallah
*Assistant Examiner* — Maria Ligai
(74) *Attorney, Agent, or Firm* — Perkins Coie LLP

(57) ABSTRACT

The present invention is directed to a display device assembly which comprises a display device and a luminance enhancement structure. The luminance enhancement structure is directly laminated onto an ITO layer with an adhesive. The assembly of the present invention provides improved performance of the luminance enhancement structure.

5 Claims, 9 Drawing Sheets

Viewing Side

(56) References Cited

U.S. PATENT DOCUMENTS

| | | | |
|---|---|---|---|
| 7,061,569 B2 | 6/2006 | Yun et al. | |
| 7,088,404 B2 | 8/2006 | Otake et al. | |
| 7,160,017 B2 | 1/2007 | Lee et al. | |
| 7,184,188 B2 | 2/2007 | Kamijima | |
| 7,212,345 B2 | 5/2007 | Wilson | |
| 7,244,476 B2 | 7/2007 | Sumida et al. | |
| 7,248,394 B2 | 7/2007 | Ding et al. | |
| 7,286,197 B2 | 10/2007 | Kwon et al. | |
| 7,294,866 B2 | 11/2007 | Liu | |
| 7,316,498 B2 | 1/2008 | Olczak | |
| 7,332,066 B2 | 2/2008 | Chen et al. | |
| 7,339,716 B2 | 3/2008 | Ding et al. | |
| 7,342,556 B2 | 3/2008 | Oue et al. | |
| 7,385,659 B2 | 6/2008 | Kotchick et al. | |
| 7,397,521 B2 | 7/2008 | Yuuki et al. | |
| 7,397,619 B2 | 7/2008 | Hwang et al. | |
| 7,408,696 B2 | 8/2008 | Liang et al. | |
| 7,428,367 B2 | 9/2008 | Lubart et al. | |
| 7,463,317 B2 | 12/2008 | Takizawa et al. | |
| 7,543,973 B2 | 6/2009 | Shimura | |
| 7,564,519 B2 | 7/2009 | Takizawa | |
| 7,576,914 B2 | 8/2009 | Goto | |
| 7,612,846 B2 | 11/2009 | Takizawa et al. | |
| 7,638,808 B2 | 12/2009 | Owen et al. | |
| 7,667,785 B2 | 2/2010 | Van Gorkom et al. | |
| 7,693,389 B2 | 4/2010 | Kamijima | |
| 7,726,827 B2 | 6/2010 | Hsu et al. | |
| 7,830,592 B1 | 11/2010 | Sprague et al. | |
| 7,927,003 B2 | 4/2011 | Chang | |
| 7,952,792 B2 | 5/2011 | Van Abeelen et al. | |
| 8,012,567 B2 | 9/2011 | Gaides et al. | |
| 8,089,452 B2 | 1/2012 | Kawai | |
| 2001/0006409 A1 | 7/2001 | Lee | |
| 2001/0026347 A1 | 10/2001 | Sawasaki et al. | |
| 2001/0033351 A1 | 10/2001 | Takami et al. | |
| 2002/0033927 A1 | 3/2002 | Mun et al. | |
| 2002/0057413 A1 | 5/2002 | Sumida et al. | |
| 2002/0180909 A1 | 12/2002 | Lubart et al. | |
| 2003/0038755 A1* | 2/2003 | Amundson et al. | 345/15 |
| 2003/0058381 A1 | 3/2003 | Shinohara et al. | |
| 2003/0165016 A1 | 9/2003 | Whitehead et al. | |
| 2003/0234900 A1 | 12/2003 | Kim | |
| 2004/0263039 A1* | 12/2004 | Takei et al. | 313/110 |
| 2005/0003108 A1 | 1/2005 | Sumida et al. | |
| 2005/0041311 A1 | 2/2005 | Mi et al. | |
| 2006/0034099 A1 | 2/2006 | Yang et al. | |
| 2006/0103779 A1 | 5/2006 | Amemiya et al. | |
| 2006/0291247 A1 | 12/2006 | Kao et al. | |
| 2007/0152592 A1 | 7/2007 | Kim et al. | |
| 2007/0200975 A1 | 8/2007 | Kamijima | |
| 2007/0253072 A1 | 11/2007 | Mullen et al. | |
| 2007/0274103 A1 | 11/2007 | Park et al. | |
| 2008/0012034 A1 | 1/2008 | Thielen et al. | |
| 2009/0231245 A1 | 9/2009 | Lin | |
| 2010/0141573 A1 | 6/2010 | Lin | |
| 2010/0176381 A1* | 7/2010 | Yagi et al. | 257/40 |
| 2010/0177396 A1 | 7/2010 | Lin | |
| 2010/0182351 A1 | 7/2010 | Lin | |
| 2010/0271407 A1 | 10/2010 | Ho et al. | |
| 2011/0043894 A1 | 2/2011 | Sprague et al. | |
| 2011/0057927 A1 | 3/2011 | Lin | |

FOREIGN PATENT DOCUMENTS

| | | |
|---|---|---|
| WO | WO 01/67170 | 9/2001 |
| WO | WO 2008/122927 | 10/2008 |
| WO | WO 2009/114361 | 9/2009 |

OTHER PUBLICATIONS

U.S. Appl. No. 12/323,300, filed Nov. 25, 2008, Sprague et al.
U.S. Appl. No. 12/323,315, filed Nov. 25, 2008, Sprague et al.
U.S. Appl. No. 12/719,702, filed Mar. 8, 2010, Lin et al.
Allen, K. (Oct. 2003). Electrophoretics Fulfilled. *Emerging Displays Review: Emerging Display Technologies, Monthly Report*—Oct. 2003, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTO News & Letters*, 102, 37-41. (in Chinese, English abstract attached).
Chen, S.M. (May 2003) The New Application and the Dynamics of Companies. *TRI.* 1-10. (In Chinese, English abstract attached).
Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.
Ho, C.,& Liang, R.C. (Dec. 2003). *Microcup® Electronic Paper by Roll-to-Roll Manufacturing Processes*. Presentation conducted at FEG, Nei-Li, Taiwan.
Ho, Candice. (Feb. 1, 2005) *Microcupt® Electronic Paper Device and Applicaiton.* Presentation conducted at USDC 4th Annual Flexible Display Conference 2005.
Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.
Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.
Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).
Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.
Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.
Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.
Lee, H., & Liang, R.C. (Jun. 2003) SiPix Microcup® Electronic Paper—An Introduction. *Advanced Display*, Issue 37, 4-9 (in Chinese, English abstract attached).
Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.
Liang, R.C. (Apr. 2004). *Microcup Electronic Paper by Roll-to-Roll Manufacturing Process*. Presentation at the Flexible Displays & Electronics 2004 of Intertech, San Francisco, California, USA.
Liang, R.C. (Oct. 2004) *Flexible and Roll-able Displays/Electronic Paper—A Technology Overview.* Paper presented at the METS 2004 Conference in Taipei, Taiwan.
Liang, R.C., & Tseng, S. (Feb. 2003). *Microcup® LCD, A New Type of Dispersed LCD by a Roll-to-Roll Manufacturing Process.* Paper presented at the IDMC, Taipei, Taiwan.
Liang, R.C., (Feb. 2005) *Flexible and Roll-able Displays/Electronic Paper— A Brief Technology Overview*. Flexible Display Forum, 2005, Taiwan.
Liang, R.C., Hou, J., & Zang, H.M. (Dec. 2002) Microcup Electrophoretic Displays by Roll-to-Roll Manufacturing Processes. *IDW*, EP2-2, 1337-1340.
Liang, R.C., Hou, J., Chung, J., Wang, X., Pereira, C., & Chen, Y. (May 2003). Microcup® Active and Passive Matrix Electrophoretic

(56) References Cited

OTHER PUBLICATIONS

Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Nikkei Microdevices. (Dec. 2002) Newly-Developed Color Electronic Paper Promises—Unbeatable Production Efficiency. *Nikkei Microdevices*, p. 3. (in Japanese, with English translation).

Sprague, R.A. (Sep. 23, 2009) SiPix Microcup Electrophoretic Epaper for Ebooks. *NIP 25 Technical Programs and Proceedings*, 2009 pp. 460-462.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

\* cited by examiner

DISPLAY DEVICE ASSEMBLY AND MANUFACTURE THEREOF

This application claims priority to U.S. Provisional Application No. 61/228,074, filed Jul. 23, 2009; the content of which is incorporated herein by reference in its entirety.

FIELD OF THE INVENTION

The present invention is directed to a display device assembly which comprises a display device and a luminance enhancement structure, and processes for its manufacture.

BACKGROUND OF THE INVENTION

The lack of satisfactory brightness is often a concern for electrophoretic display devices. Total internal reflection inevitably would occur with an electrophoretic display device because such a display device usually has components of a high refractive index. Due to the components having a higher refractive index (e.g., about 1.5) than the air (which has a refractive index of about 1) surrounding the device, some of the scattering light from the display panel may reflect off the display front surface and back to the display device by total internal reflection. This total internal reflection phenomenon may result in a loss of about 30-50% of the scattering light, thus causing reduction in brightness of the display device.

To improve the brightness of a display device, a luminance enhancement structure may be laminated onto the viewing side of a display device to reduce the loss of brightness due to total internal reflection and to redirect some of the incident light towards the viewer. Unfortunately, the performance of such a luminance enhancement structure may be affected by the thickness of the substrate layer such as a polyethylene terephthalate (PET) layer, present between the display device and the luminance enhancement structure. Although efforts have been made to reduce the thickness of the PET substrate, the results achieved so far are not entirely satisfactory.

SUMMARY OF THE INVENTION

The first aspect of the present invention is directed to a display device assembly, which comprises a) display cells filled with a display fluid, wherein said display cells are sandwiched between a backplane and a common electrode layer (i.e., an ITO layer), and b) a luminance enhancement structure, wherein said luminance enhancement structure is directly laminated over the common electrode layer optionally with an adhesive.

In one embodiment, the display fluid comprises charged pigment particles dispersed in a solvent or solvent mixture.

In one embodiment, the display fluid comprises one type of particles.

In one embodiment, the display fluid comprises two types of particles.

In one embodiment, the luminance enhancement structure comprises columns and grooves, wherein each of said grooves has a cross-section comprising an apex angle and two edge lines.

In one embodiment, the luminance enhancement structure has a one dimensional configuration.

In one embodiment, the luminance enhancement structure has a two dimensional configuration.

In one embodiment, the apex angles in the luminance enhancement structure are in the range of about 5° to about 50°.

In one embodiment, the adhesive has a thickness of about 2 microns or less.

The second aspect of the present invention is directed to a process for the manufacture of a display device assembly, which process comprises a) forming display cells on a common electrode layer (i.e., an ITO layer) coated on a substrate layer;

b) removing said substrate layer; and c) laminating a luminance enhancement structure directly to the common electrode layer with an adhesive.

In one embodiment, the substrate layer is removed with the aid of a release layer.

The present invention provides a display device, assembly in which a substrate layer is eliminated and processes for producing such a display device assembly.

Without a substrate layer between a display device and a luminance enhancement structure, the performance of the luminance enhancement structure can be significantly improved.

DETAILED DESCRIPTION OF THE INVENTION

I. Conventional Display Devices

Figure 1A:
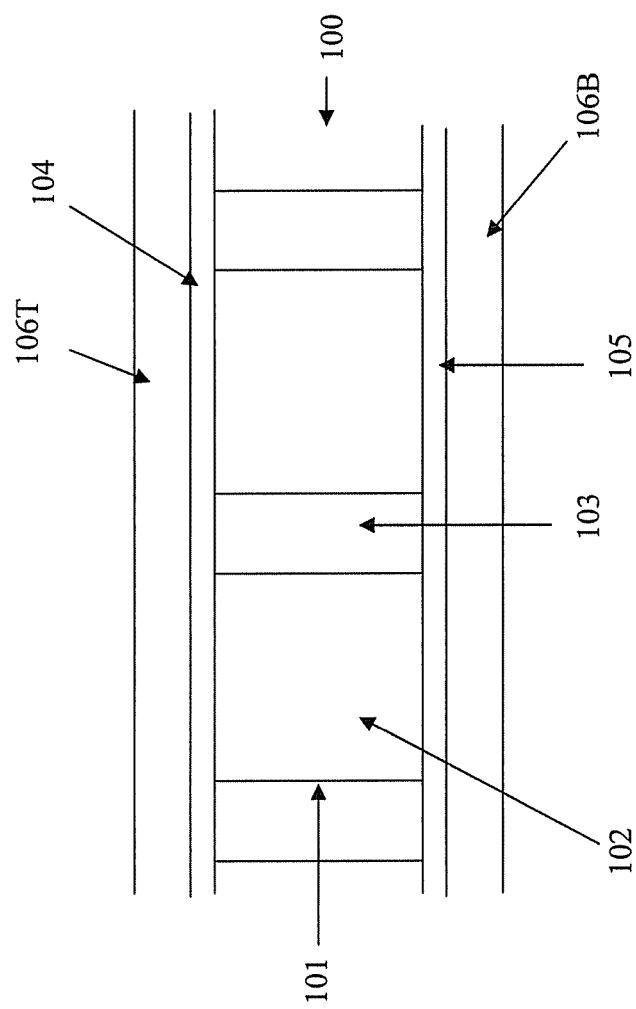
FIG. 1a depicts a cross-section view of a display device.

FIG. 1a illustrates a display device (100). The device comprises display cells (101) which are filled with a display fluid (102) and sandwiched between two electrode layers (104 and 105). Each of the display cells is surrounded by partition walls (103).

For an electrophoretic display, the display cells are filled with an electrophoretic fluid which comprises charged pigment particles dispersed in a solvent. The display fluid may be a system comprising one or two types of particles.

In the system comprising only one type of particles, the charged pigment particles are dispersed in a solvent of a contrasting color. The charged particles will be drawn to one of the electrode layers (104 or 105), depending on the potential difference of the two electrode layers, thus causing the display panel to show either the color of the particles or the color of the solvent, on the viewing side.

In a system comprising particles carrying opposite charges and of two contrasting colors, the particles would move to one electrode layer or the other, based on the charge that they carry and the potential difference of the two electrode layers, causing the display panel to show the two contrasting colors, on the viewing side. In this case, the particles may be dispersed in a clear and colorless solvent.

The display cells may also be filled with a liquid crystal composition. In addition, it is understood that the present invention is applicable to all types of reflective display devices.

For a segment display device, the two electrode layers (104 and 105) are one common electrode (e.g., ITO) and one patterned segment electrode layer, respectively. For an active matrix display device, the two electrode layers (104 and 105) are one common electrode and an array of thin film transistor pixel electrodes, respectively. For a passive matrix display device, the two electrode layers (104 and 105) are two line-patterned electrode layers.

The patterned segment electrode layer (in a segment display device), the thin film transistor pixel electrodes (in an active matrix display device) or one of the two line-patterned electrode layers (in a passive matrix display device) may be referred to as a "backplane", which along with the common electrode drives the display device.

The electrode layers are usually formed on substrate layers (see, for example, 106T and 106B). For segment displays, the backplane is usually a printed circuit board on polyethylene terephthalate (PET). For active matrix displays, the backplane may be glass based or on a flexible substrate such as PET or PEN (polyethylene naphthalate). The uniform electrode layer 104 is usually on a substrate layer which may be a flexible substrate layer.

For a microcup-based display device disclosed in U.S. Pat. No. 6,930,818, the content of which is incorporated herein by reference in its entirety, the filled display cells are sealed with a polymeric sealing layer. Such a display device may be viewed from the sealing layer side or the side opposite the sealing layer side, depending on the transparency of the materials used and the application.

Figure 1B:
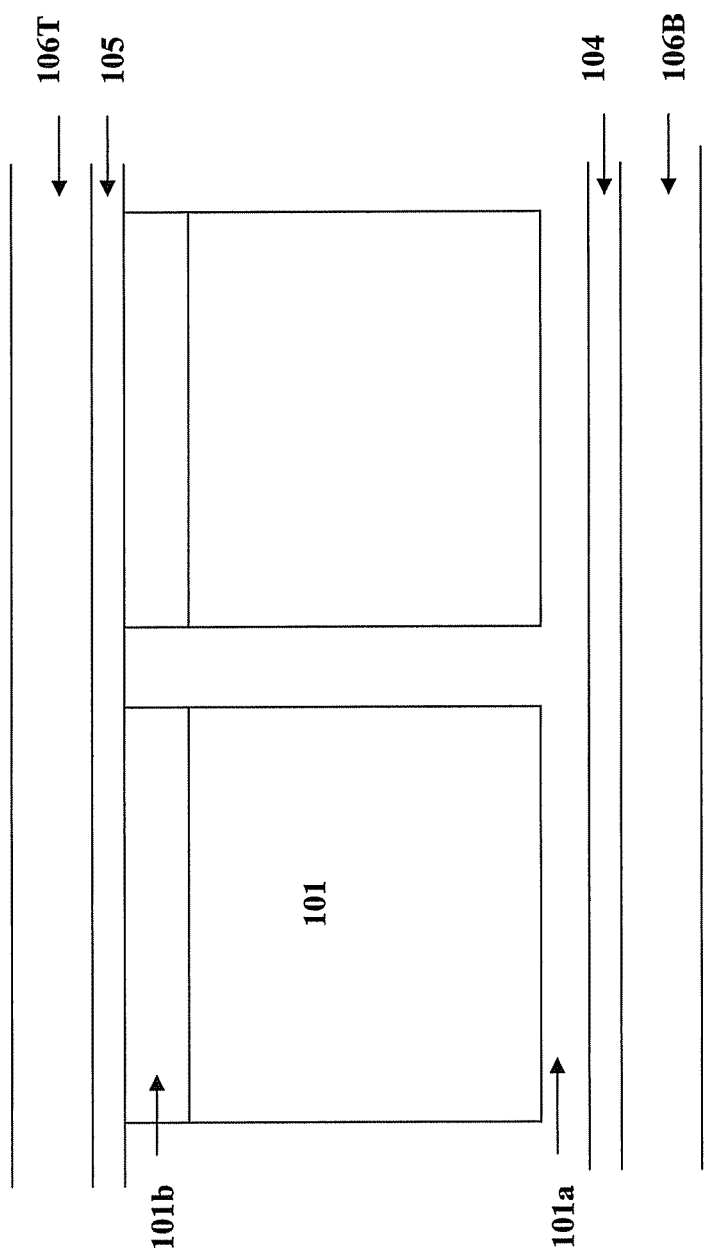
FIG. 1b depicts a microcup-based display device.

FIG. 1a is a generic sketch of a display device. In the case of a microcup-based display device, each of the display cells (101) usually has a cell bottom (101a) and is sealed with a polymeric sealing layer (101b), as shown in FIG. 1 b.

Figure 2:
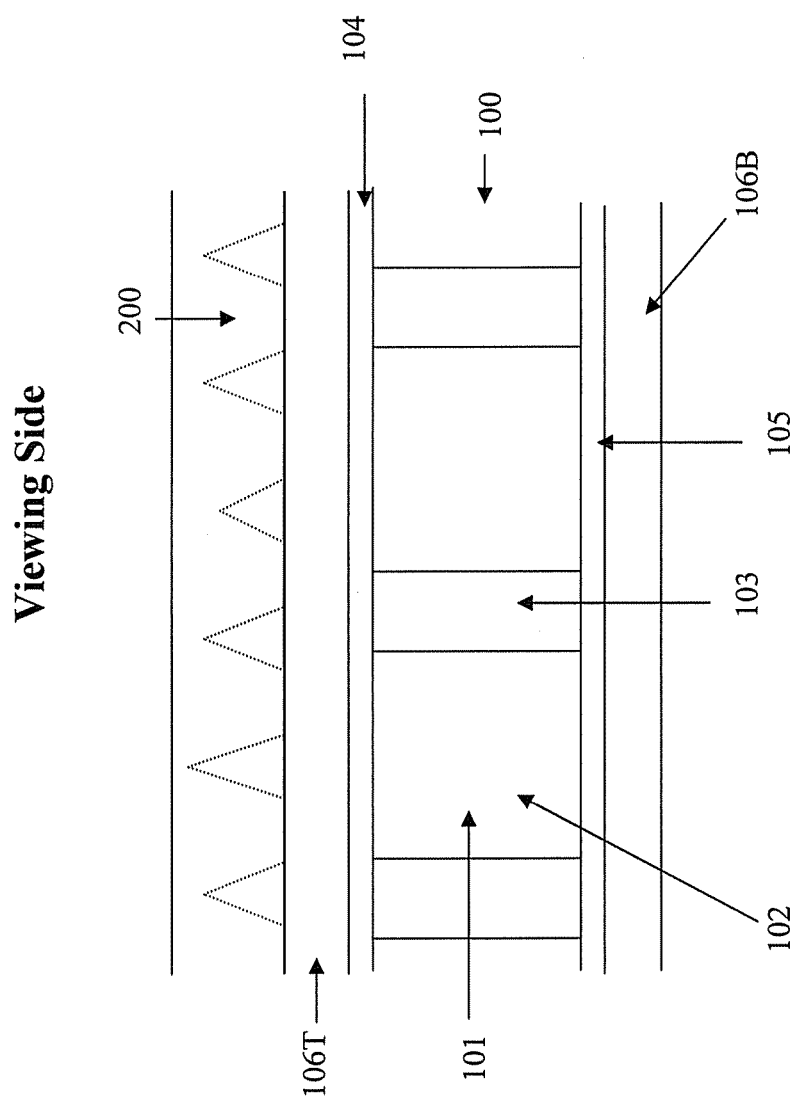
FIG. 2 is a cross-section view of a display device with a luminance enhancement structure.

FIG. 2 depicts a cross-section view of a luminance enhancement structure (200) on the viewing side of a display device. As shown, the luminance enhancement structure is now in optical contact with the top substrate layer (106T) of the display device. The thickness of the top substrate layer (106T) is usually between about 5 μm to about 175 μm. Such a substrate layer negatively affects the performance of the luminance enhancement structure.

II. The Present Invention

Figure 3:
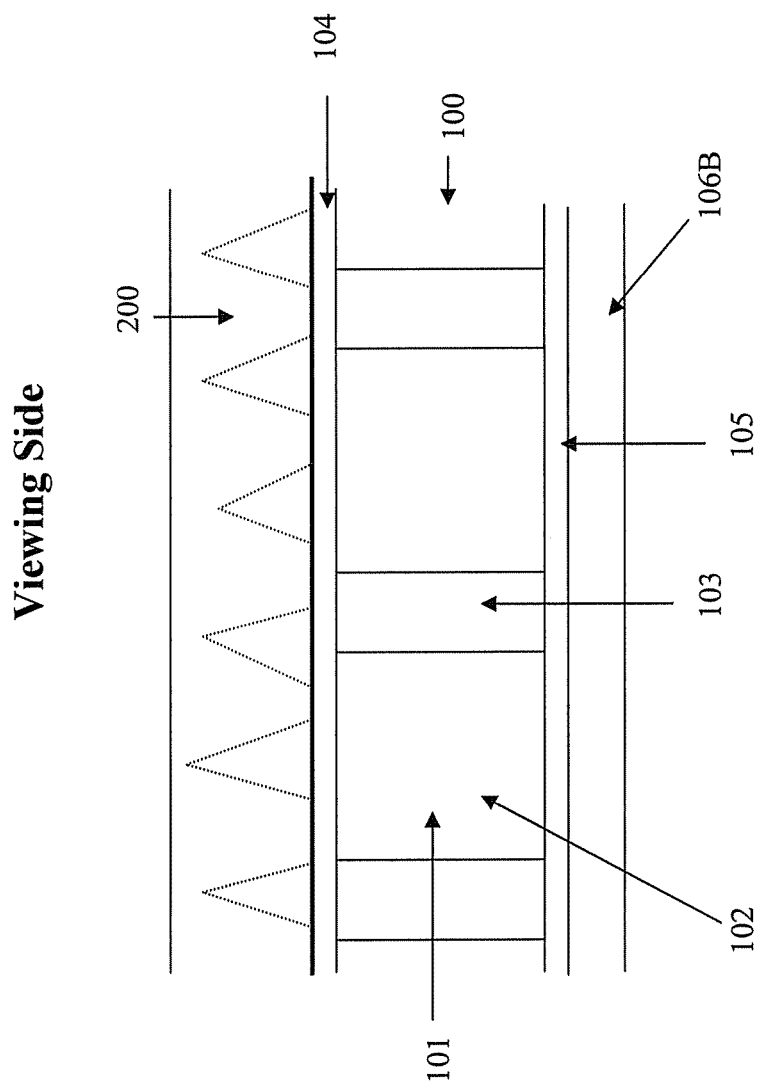
FIG. 3 shows a display device of the present invention without a substrate layer between the display device and the luminance enhancement structure.

FIG. 3 illustrates a display device assembly of the present invention with a luminance enhancement structure (200) and there is no substrate layer between the display device and the luminance enhancement structure.

Figure 4A:
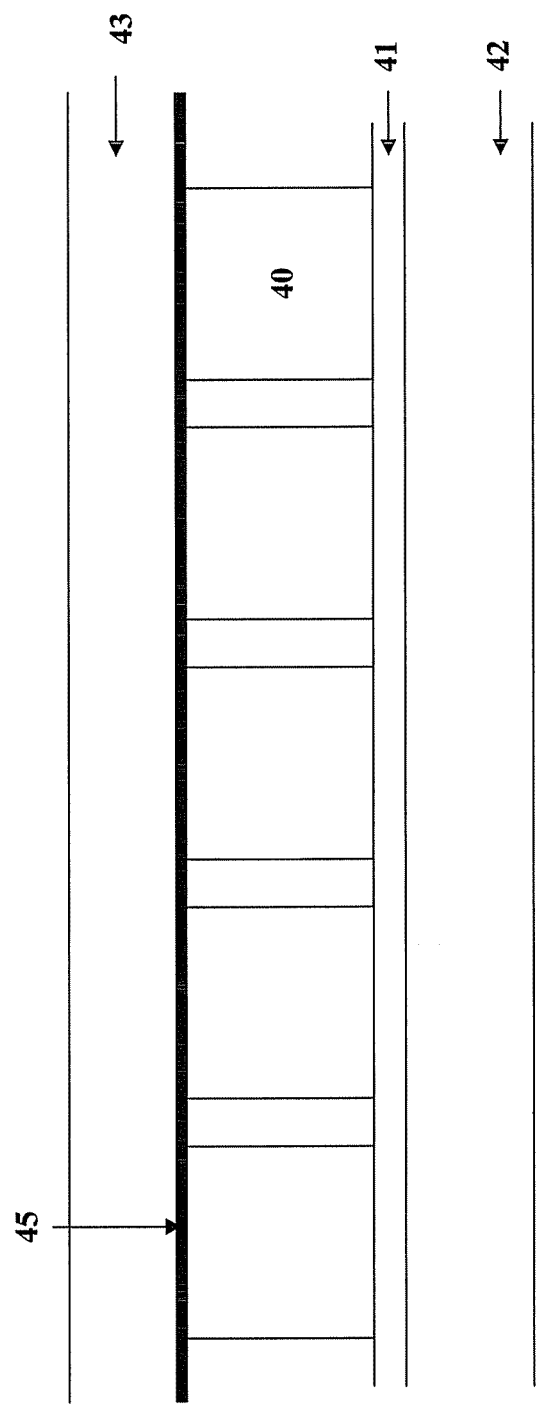
FIGS. 4a and 4b show how the display device assembly of the present invention is produced.
Figure 4B:
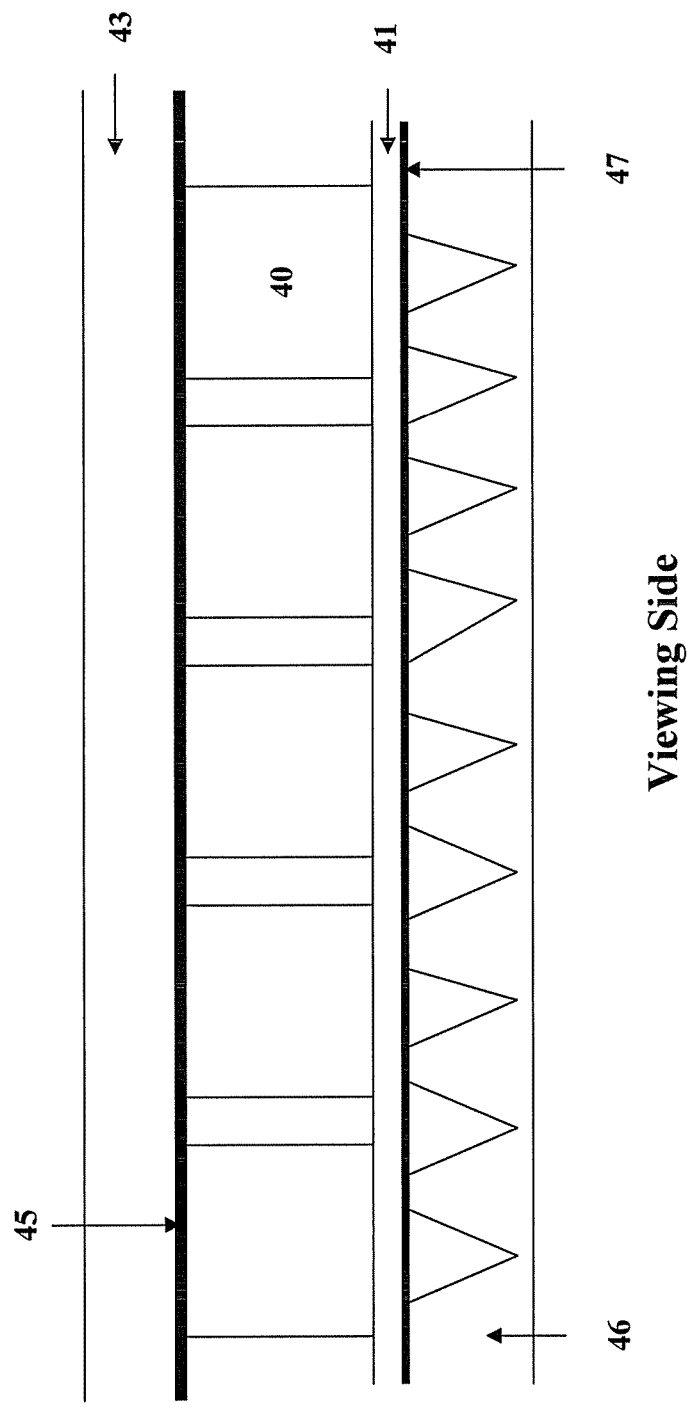

The display device assembly of FIG. 3 may be achieved according to the process as described in FIGS. 4a-4b.

In FIG. 4a, a layer of display cells (e.g., microcups) (40) are first formed on an ITO (indium tin oxide) (41) layer which is coated on a substrate layer (42). The display cells are filled with a display fluid and the filled display cells may be individually sealed with a polymeric sealing layer (not shown). The filled and sealed display cells are then laminated with a backplane (43), optionally with an adhesive layer (45).

To achieve a display device of the present invention, the substrate layer (42) is removed but not the ITO layer (41). The removal of the substrate layer (42) is a critical step of the present invention, which may be accomplished in a number of ways. For example, there may be a release layer between the substrate layer (42) and the ITO layer (41). The substrate layer may then be simply removed by being peeled off with the release layer.

An alternative approach is to dissolve the substrate layer 42 using the ITO layer as an etch stop to protect the rest of the device components. In this approach, a PET substrate layer may be removed with an organic solvent commonly known to be able to dissolve PET, such as o-chlorophenol, tetrachlorethane/phenol or the like.

After the substrate layer is removed, a luminance enhancement structure (46) may be laminated directly over the ITO layer, with an adhesive (47). By using this approach, the thickness of the layer between the luminance enhancement structure (46) and the ITO layer (41) is reduced to the thickness of the adhesive (47) used for bonding, rendering a distance of about 2 microns or less between the ITO layer (41) and the luminance enhancement structure (46) very achievable. About" as used in this application, refers to ±15% of the recited value.

Alternatively, the filled and sealed display cells, in FIG. 4a, may be laminated with a release liner instead of the backplane (43). The release liner is then removed (e.g., peeled off) and replaced with the backplane (43) to complete the display device assembly. This step may take place before or after lamination of a luminance enhancement structure.

III. Luminance Enhancement Structure

Any of the known luminance enhancement structure may be added to a display device.

Figure 5A:
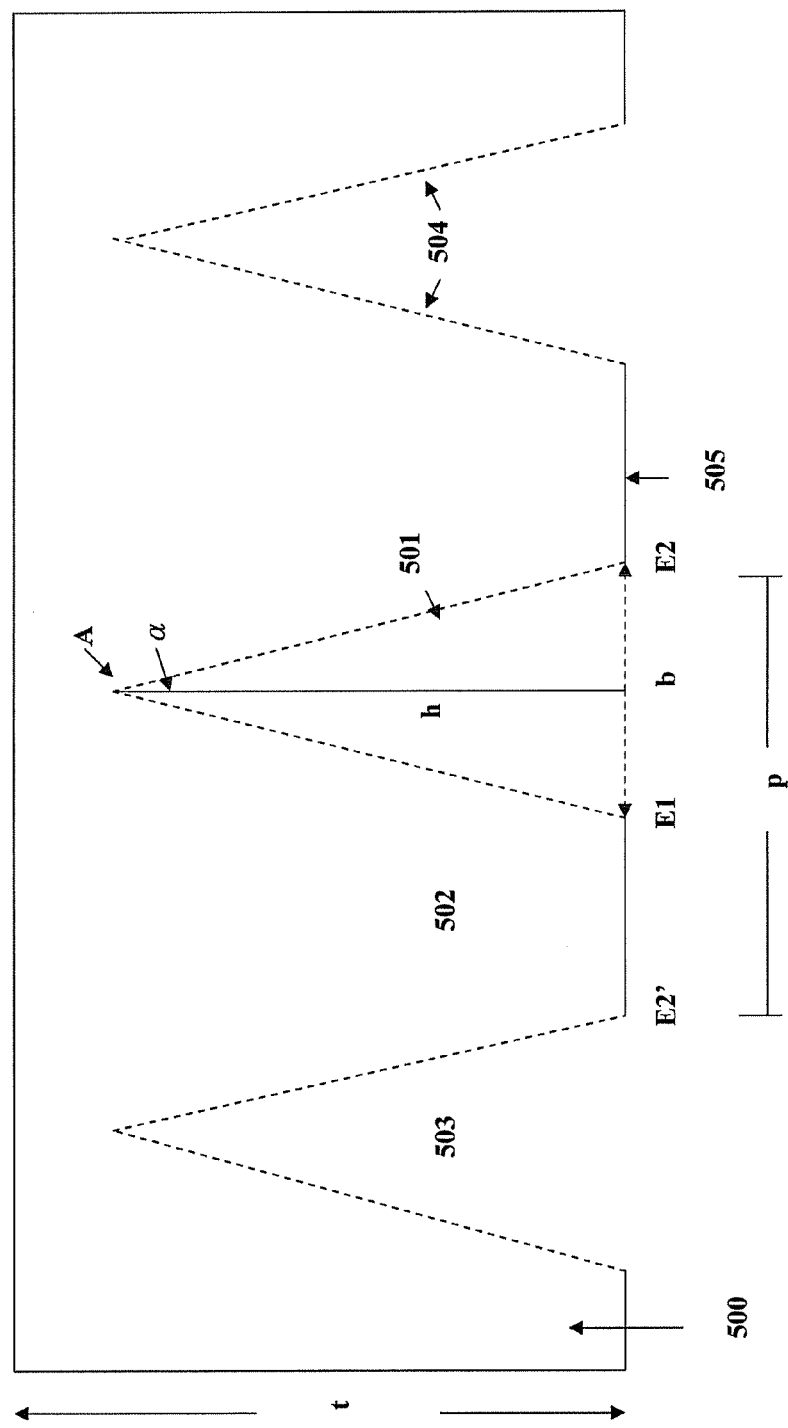
FIG. 5a is a cross-section view of a luminance enhancement structure of the present invention.

FIG. 5a is a cross-section view of a luminance enhancement structure (500) which may be incorporated into the assembly. There are multiple columns (502) and grooves (503) across the structure. The cross-section (501) of the grooves (503) has a top point A and a base line (b). The dotted lines connecting the top point A to the two ends (E1 and E2) of the base line are referred to as "edge lines". The two edge lines form an apex angle α. The dotted line means that the edge line may be a straight line or may comprise two or more segments of straight line. The surface (504) of the grooves (503) is optically flat and optionally coated with a metal layer. In one embodiment, the surface (504) is preferably uncoated.

The columns (502) have a top surface (505). The thickness ("t") of the luminance enhancement structure may be in the range of about 10 μm to about 200 μm.

The luminance enhancement structure is formed from a material having a refractive index of about 1.4 to 1.7. The luminance enhancement structure is transparent.

Figure 5B:
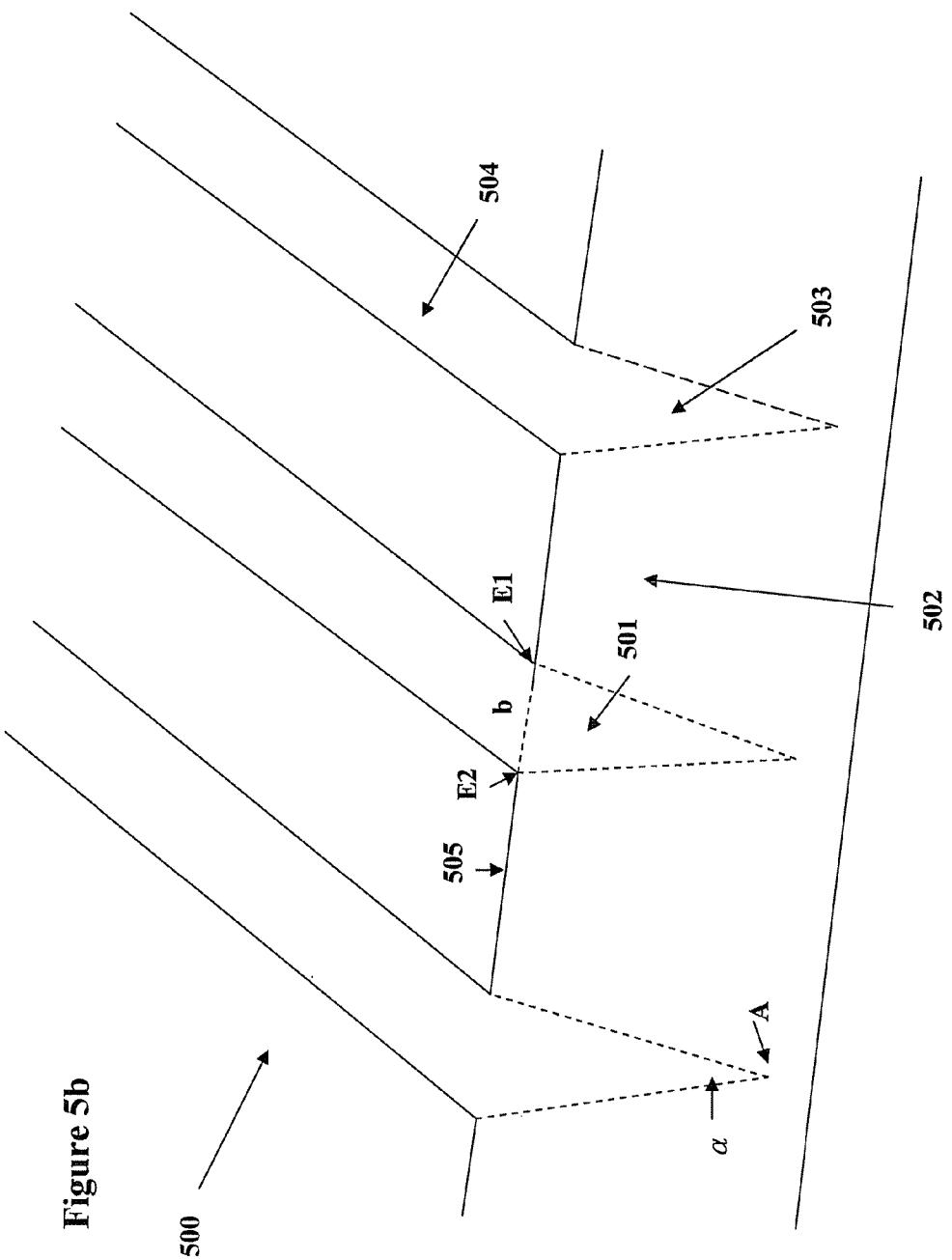
FIGS. 5b and 5c are three-dimensional views of two luminance enhancement structures.
Figure 5C:
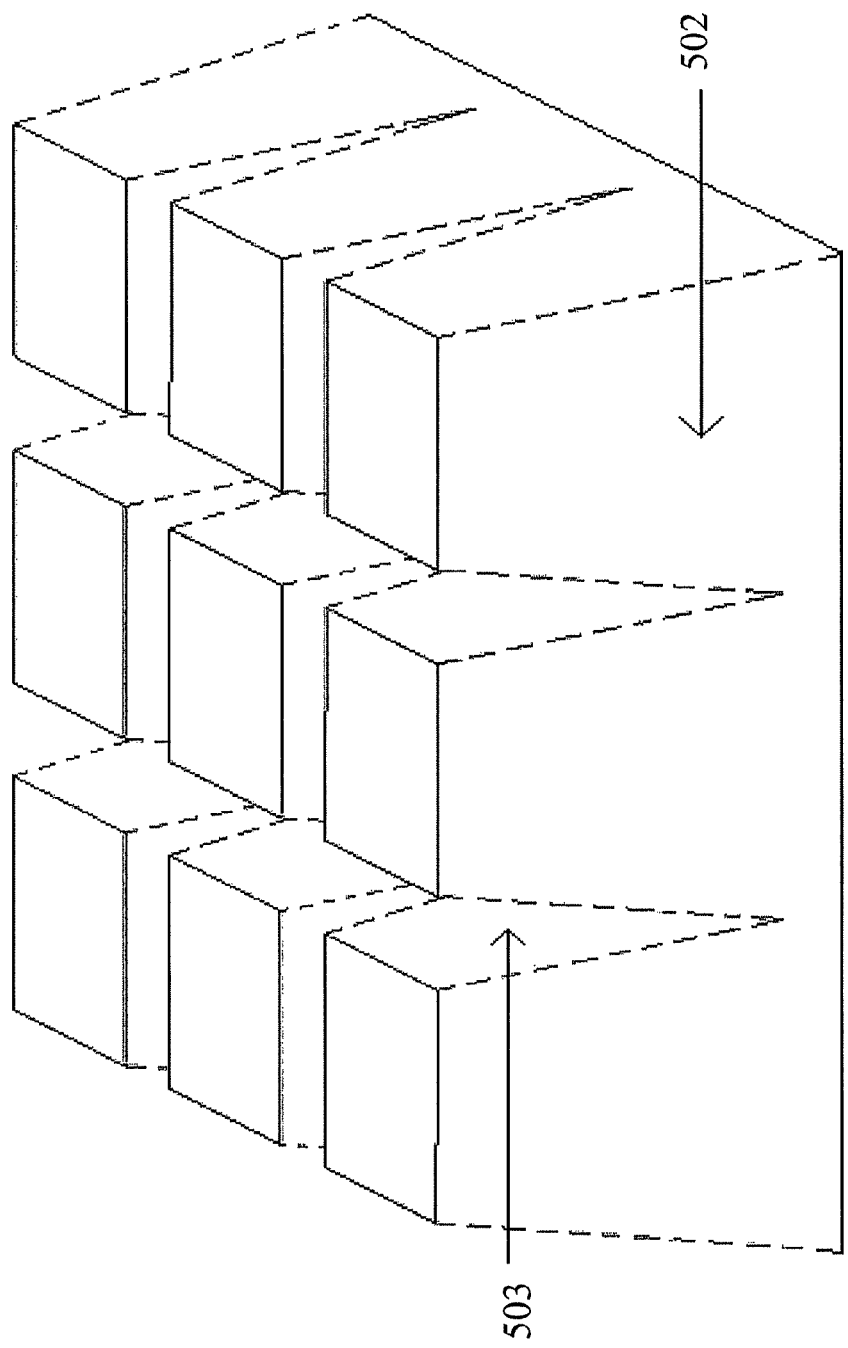

FIG. 5b is a three-dimensional view of the luminance enhancement structure (500) in a one-dimensional configuration (i.e., the columns and grooves are in alternating order and in continuous form in one direction). FIG. 5c is a three-dimensional view of the luminance enhancement structure (500) in a two dimensional configuration.

The luminance enhancement structure may have different structural designs, all of which are within the scope of the present invention.

For example, the two edge lines of the grooves in a luminance enhancement structure may be straight lines and the apex angles (a) are substantially equal for all grooves throughout the structure.

In this first design, the two edge lines of the cross-section may be substantially equal (i.e., isosceles triangular cross-section) for all grooves, or the two edge lines may be substantially equal for some of the grooves and the two edge lines are not equal for the remaining grooves, or the two edge lines may be different for all grooves. The heights "h" of the grooves may be substantially equal throughout the structure or the heights of the grooves may vary. The pitches ("p") of the grooves may be substantially equal for all grooves throughout the structure or the pitches "p" of the grooves may vary. The term "pitch" is defined as the distance between one end point (E2) of the base line (b) of one groove and the corresponding point (E2') of the next groove. In other words, the term "pitch"

is the sum of the width of the base line (b) and the width of the top surface of a column between the two grooves.

In another design, the two edge lines are straight lines and the apex angles α, however, are not all equal for the grooves. For example, there may be 70% of the apex angles are substantially equal while the remaining apex angles vary. In this second design, the two edge lines of the cross-section may be substantially equal (i.e., isosceles triangular cross-section) for all grooves, or the two edge lines may be substantially equal for some of the grooves and the two edge lines are not equal for the remaining grooves, or the two edge lines may be different for all grooves. The apex angles may have not more than five different sizes throughout the structure. The heights "h" of the grooves may be substantially equal throughout the structure or the heights of the grooves may vary. The pitches ("p") of the grooves may be substantially equal for all grooves throughout the structure or the pitches ("p") of the grooves may vary.

In any case, the grooves of different apex angles are randomly located in the luminance enhancement structure.

The luminance enhancement resulted from different apex angles as described as the second design may be similarly achieved by maintaining the apex angles substantially equal while varying the angles of the edge lines of the grooves. In this third design, each of the edge lines of the cross section may comprise two or more segments of straight line and the different segments of the straight line have different edge line angles. The term "edge line angle" is referred to the angle of a segment of the straight line from the normal axis. In this third design, the apex angles may be maintained substantially equal for all grooves throughout the structure. The apex angles may vary; however, it is not needed. In one example, each edge line is formed of two segments of straight line whereby edge line angle of one segment of straight line is not equal to the edge line angle of another segment of straight line.

It is noted that while the number of the segments increases, the edge lines would appear to be curved. It is also understood that the curved line may consist of more than one curvature, depending on how the segments of the straight line are connected.

In this third design, the two edge lines of a single groove may have different numbers of segments of straight line. For example, one of the edge lines of a groove is formed of two segments of straight line while the other edge line is formed of three segments of straight line. Alternatively, all grooves may have the same set of two edge lines.

In a further design, the columns of the luminance enhancement structure may have wavy edges.

The details of luminance enhancement structure may be found in U.S. Ser. No. 12/323,300 filed on Nov. 25, 2008, U.S. Ser. No. 12/323,315 filed on Nov. 25, 2008, U.S. Ser. No. 12/397,917 filed on Mar. 4, 2009, U.S. Ser. No. 61/120,243 filed on Dec. 5, 2008, U.S. Ser. No. 61/144,322 filed on Jan. 13, 2009, U.S. Ser. No. 61/146,552 filed on Jan. 22, 2009 and U.S. Ser. No. 61/158,636 filed on Mar. 9, 2009, the contents of all of which are incorporated herein by reference in their entirety.

Regardless of the configurations, the size of the apex angles throughout this application, is preferably within the range of about 5° to about 50°, more preferably of about 20° to about 40°.

In addition, in all of the designs illustrated above, the luminance enhancement structure may be one dimensional (FIG. 5b) or two dimensional (FIG. 5c). However, it is preferable that the structure is one dimensional.

Unless otherwise stated, the term "substantially equal" or "substantially the same" is intended to refer to the fact that the variances for the angles or distances are within the range of manufacturing tolerances.

The luminance enhancement structure as described may be fabricated in many different ways, for example, by methods as disclosed in the US patent applications referred to above.

The luminance enhancement structure comprising grooves (uncoated or coated with a metal layer) is then laminated over the ITO layer of a display device.

For a two dimensional luminance enhancement structure, it may be manufactured by a self-aligned process as disclosed in U.S. Ser. No. 12/323,300 filed on Nov. 25, 2008, the content of which is incorporated herein by reference in its entirety. In the self-aligned process, the display cells are formed by a photolithography process, utilizing the luminance enhancement structure as a photomask.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device assembly, comprising:
    a) a display device comprising display cells filled with a display fluid, wherein said display cells are sandwiched between a backplane and a common electrode layer, and
    b) a luminance enhancement structure on a viewing side of the display device, wherein said luminance enhancement structure has a one dimensional configuration and comprises grooves and columns in an alternating order, wherein each of said grooves has a cross-section comprising an apex angle and two edge lines and each of said columns has a flat top surface, and the flat top surface of the column is directly laminated to the common electrode layer without a substrate layer in between.

2. The assembly of claim 1, wherein said display fluid comprises charged pigment particles dispersed in a solvent or solvent mixture.

3. The assembly of claim 1, wherein said display fluid comprises one type of particles.

4. The assembly of claim 1, wherein said display fluid comprises two types of particles.

5. The assembly of claim 1, wherein said apex angle is in the range of about 5° to about 50°.

* * * * *